United States Patent
Zander et al.

(10) Patent No.: US 11,502,740 B2
(45) Date of Patent: Nov. 15, 2022

(54) METHOD AND DEVICE FOR LISTEN-BEFORE-TALK PROCEDURE ALLOWING FOR LARGER ENERGY THRESHOLD

(71) Applicant: Sony Corporation, Tokyo (JP)

(72) Inventors: Olof Zander, Lund (SE); Rickard Ljung, Helsingborg (SE); Erik Bengtsson, Lund (SE); Fredrik Rusek, Esloev (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/269,396

(22) PCT Filed: Aug. 12, 2019

(86) PCT No.: PCT/SE2019/050739
§ 371 (c)(1),
(2) Date: Feb. 18, 2021

(87) PCT Pub. No.: WO2020/055296
PCT Pub. Date: Mar. 19, 2020

(65) Prior Publication Data
US 2021/0391914 A1    Dec. 16, 2021

(30) Foreign Application Priority Data

Sep. 13, 2018   (SE) .................................... 1851082-6

(51) Int. Cl.
*H04B 7/10* (2017.01)
*H04W 74/08* (2009.01)

(52) U.S. Cl.
CPC .......... *H04B 7/10* (2013.01); *H04W 74/0808* (2013.01)

(58) Field of Classification Search
CPC ............................ H04B 7/10; H04W 74/0808
See application file for complete search history.

(56) References Cited

U.S. PATENT DOCUMENTS

2009/0207093 A1* 8/2009 Anreddy ............. H04B 7/0805
                                                         343/893
2018/0054342 A1 2/2018 Nory
(Continued)

FOREIGN PATENT DOCUMENTS

EP          3484225 A1     5/2019
WO      2016147129 A1     9/2016

OTHER PUBLICATIONS

International Search Report and Written Opinion from corresponding International Application No. PCT/SE2019/050739, dated Nov. 15, 2019, 14 pages.
(Continued)

*Primary Examiner* — Dac V Ha
(74) *Attorney, Agent, or Firm* — Tucker Ellis LLP

(57) ABSTRACT

A method for performing a listen-before-talk procedure in a first transceiver device (N1) for wireless electromagnetic communication in a frequency band (150) is disclosed. A first transceiver device (N1) configured to perform the method is also disclosed. The method comprises receiving at the first transceiver device (N1) a stream of data (11) from a second transceiver device (N2), and determining whether the second transceiver device (N2) is capable of receiving in only a single or in two polarization directions. If the second transceiver device (N2) is capable of receiving in two polarization directions, then the method comprises determining and using an energy threshold that is larger than a regulated energy threshold for listen-before-talk within the frequency band (150). If the second transceiver device (N2) is capable of receiving in only a single polarization direction or if the energy of the received stream of data (11) is smaller (Continued)

than the energy threshold, then constructing a signal to be transmitted within the frequency band (150) by the first transceiver device (N1).

17 Claims, 8 Drawing Sheets

(56) References Cited

U.S. PATENT DOCUMENTS

| | | | |
|---|---|---|---|
| 2018/0063693 A1* | 3/2018 | Chakraborty | H04W 8/005 |
| 2018/0235008 A1 | 8/2018 | Park | |
| 2018/0255551 A1* | 9/2018 | Geraci | H04L 69/28 |
| 2018/0270037 A1 | 9/2018 | Wang | |
| 2019/0104542 A1* | 4/2019 | Chendamarai Kannan | H04B 7/0408 |
| 2019/0191290 A1 | 6/2019 | Poitau | |
| 2020/0314906 A1* | 10/2020 | Goyal | H04B 7/0695 |

OTHER PUBLICATIONS

Wollenschlager, Frank et al., "A Compact Dual-Polarized Wideband Patch Antenna Array for the Unlicensed 60 GHz Band", IEEE, Proceedings of the 5th European Conference on Antennas and Propagation (EUCAP), Apr. 11, 2011, 5 pages.

ITRI, "Further evaluation results for LAA frequency reuse", 3GPP TSG RAN WG1 Meeting #82, R1-154369, Aug. 24-28, 2015, 6 pages.

Guo, Caili et al., "Advances on Exploiting Polarization in Wireless Communications: Channels, Technologies, and Applications"; IEEE Communications Surveys & Tutorials, vol. 19, No. 1, Sep. 7, 2016; 42 pages.

Swedish Office Action and Search Repod from corresponding Swedish Application No. 1851082-6, dated May 3, 2019, 8 pages.

\* cited by examiner

METHOD AND DEVICE FOR LISTEN-BEFORE-TALK PROCEDURE ALLOWING FOR LARGER ENERGY THRESHOLD

The present disclosure relates to methods and devices for enhancing wireless radio communication on unlicensed frequency bands.

BACKGROUND

This invention is related to radio transmissions on unlicensed frequency bands. When communicating on unlicensed bands there is typically a requirement to perform a clear channel assessment (CCA), often referred to as a Listen-Before-Talk procedure (LBT). LBT is a mechanism that may be used for efficiently sharing a common spectrum between multiple wireless local area network (LAN) devices whereby a transmitter first senses its environment before it starts a transmission. LBT can be used by a device to find out whether a channel, frequency band or spectrum is free to operate on. A main limitation is the threshold of energy level on the channel to which the device has to listen to decide if it can transmit. The lower energy detection threshold used, the lower likelihood of concluding by the LBT procedure that the channel is free to operate on.

SUMMARY

Accordingly, there is a need for devices and methods which mitigates or alleviates the shortcomings of the LBT procedures, for example by providing higher spectral efficiency. In particular, there is a need for devices and methods for performing Listen-Before-Talk procedures allowing for a larger energy threshold.

The present disclosure provides a method of performing a listen-before-talk procedure in a first transceiver device for wireless electromagnetic communication in a frequency band. The method comprises receiving, in two orthogonal polarisation directions, at the first transceiver device a stream of data in the frequency band from a second transceiver device. The method comprises determining whether the second transceiver device is capable of receiving in only a single polarization direction or whether the second transceiver device is capable of receiving in two polarization directions. The method comprises, if the second transceiver device is capable of receiving in two polarization directions, then determining a first energy threshold equal to or larger than a regulated energy threshold for listen-before-talk within the frequency band. The method comprises comparing the first energy threshold to an energy of the received stream of data in the frequency band. The method comprises, if the second transceiver device is capable of receiving in only a single polarization direction or if the energy of the received stream of data is smaller than the first energy threshold, then constructing a signal to be transmitted within the frequency band by the first transceiver device.

Further, a first transceiver device for wireless electromagnetic communication in a frequency band is provided. The first transceiver device being capable of receiving in two polarization directions in the frequency band. The first transceiver device comprises a processor configured to perform a listen-before-talk procedure. The processor is configured to receive, in two orthogonal polarisation directions, a stream of data from a second transceiver device and determining whether the second transceiver device is capable of receiving in only a single polarization direction or whether the second transceiver device is capable of receiving in two polarization directions. If the second transceiver device is capable of receiving in two polarization directions, then the processor is configured to determine a first energy threshold equal to or larger than a regulated energy threshold for listen-before-talk within the frequency band and comparing the first energy threshold to an energy of the received stream of data. If the second transceiver device is capable of receiving in only a single polarization direction or if the energy of the received stream of data is smaller than the first energy threshold, then the processor is configured to construct a signal to be transmitted by the first transceiver.

It is an advantage of the present disclosure that the spectral efficiency of the communication and the utilization of the frequency band are improved in that the first energy threshold is larger than a regulated energy threshold for listen-before-talk procedures within the frequency band. This allows the first transceiver device to transmit in instances where a transceiver device operating under a prior art LBT procedure would not transmit, and thus provide the improved utilization of the frequency band.

The present disclosure also provides a network of transceiver devices for wireless electromagnetic communication in a frequency band. The network comprising the first transceiver device according to the disclosure and a second transceiver device. The second transceiver device comprising a processor configured to generate an indication indicating whether the second transceiver device is capable of receiving in only a single polarization direction or in two polarization directions; and including the indication in signals to be transmitted by the second transceiver device.

The present disclosure provides a computer readable storage medium storing one or more programs, the one or more programs comprising instructions, which when executed by a transceiver device cause the transceiver device to perform any of the methods disclosed herein. The computer programs provide advantages corresponding to the advantages already described in relation to the methods performed by the transceiver device.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
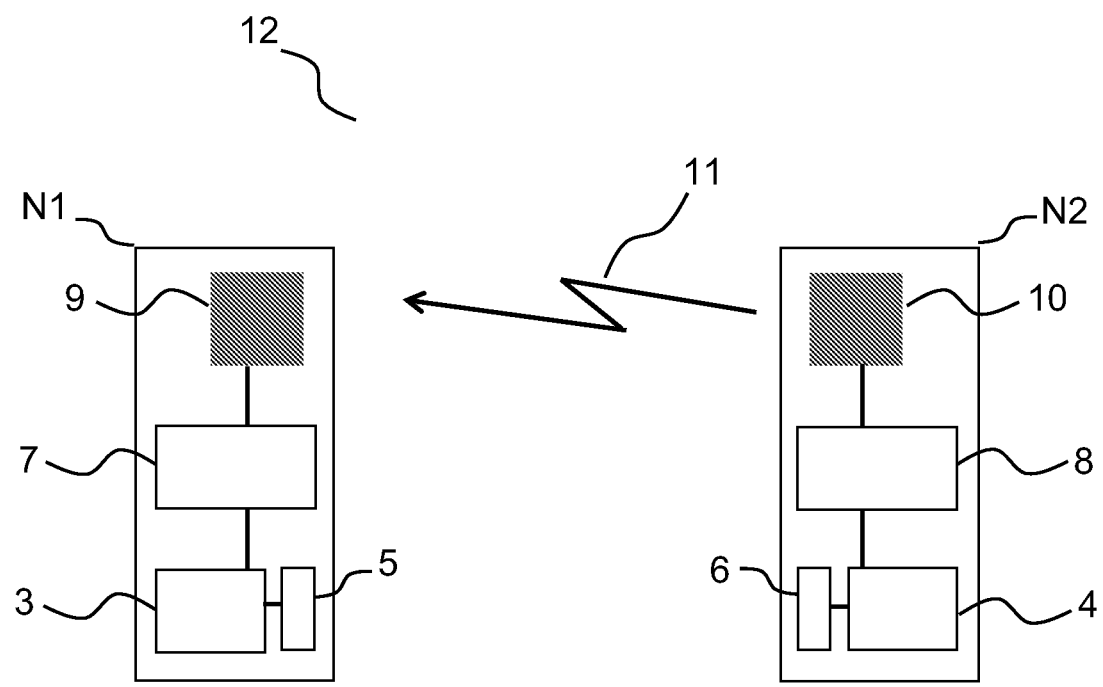
FIG. 1 schematically illustrates exemplary first and second transceiver devices.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments.

They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A common setup of Listen-Before-Talk is as follows: A first and a second node are operating on the same channel, the first node wants to transmit a signal. It listens to the channel in some direction, if it overhears power less than a threshold on the channel, it transmits. If the overheard power exceeds the threshold it does not transmit, and typically needs to wait a determined time until performing a new LBT attempt. The energy threshold value may be a specified energy threshold set by regulations (such as rules determined for usage of a specific unlicensed spectrum) or by a network control function such as communicated by a network node/base station or similar. This regulated energy threshold (prior art) is used without regard to the polarisation content of the received stream and is used without regard to the intended polarization content of the signal that the first node wants to transmit. In this respect, polarization content refers to the electromagnetic polarisation directions of the signal(s) making up the received stream of data or signal to be transmitted. The energy threshold is sometimes proportional to the transmit power of the transmitter. Such regulated energy threshold is designated $\beta$ for later reference.

In one example, for a 60 GHz unlicensed band, the energy detection threshold for the CCA is $\beta=-47$ dBm+(40 dBm−$P_{out}$ [dBm]) assuming 0 dBi antenna gain, see https://www.etsi.org/deliver/etsi_en/302500_302599/302567/02.00.22_20/en_302567v020022a.pdf. In another example, for a 5 GHz unlicensed band, the energy detection threshold for the CCA is proportional to the maximum transmit power (PH) of the transmitter; for a 23 dBm Effective Isotropic Radiated Power transmitter the CCA threshold $\beta$ shall be equal or lower than −73 dBm/MHz at the input to the receiver (assuming a 0 dBi receive antenna), see https://www.etsi.org/deliver/etsi_en/301800_301899/301893/01.02.02_30/en_301893v010202v.pdf). It is common in the field to use both reference to energy and power when discussing energy content and threshold, where power is equal to energy per time unit and energy is equal to power integrated over time).

The figures are schematic and simplified for clarity, and they merely show details which are essential to the understanding of the invention, while other details have been left out. Throughout, the same reference numerals are used for identical or corresponding parts.

The present disclosure provides a first transceiver device for wireless electromagnetic communication in a frequency band, the first transceiver device being capable of receiving in two polarization directions in the frequency band and comprises a processor configured to perform a listen-before-talk procedure.

FIG. 1 is a block diagram showing an exemplary first transceiver device N1 according to the disclosure and a second transceiver device N2 transmitting a stream of data 11 intercepted by the first transceiver device N1. Each transceiver device N1 and N2 may be any device capable of wireless communication within the frequency band, such as an RF transceiver module alone or incorporated in another device. The first transceiver device N1 comprises a processor 3 optionally configured to perform any of the operations disclosed in FIGS. 3 through 8. The first transceiver device N1 may also comprise a memory module 5 connected to the processor 3 as well as a transceiver module 7 and an antenna 9 via which the processor 3 may transmit and receive wireless electromagnetic communication signals.

The operations of the first transceiver device N1 may be embodied in the form of executable logic routines (e.g., lines of code, software programs, etc.) that are stored on a non-transitory computer readable medium (e.g., the memory module 5) and are executed by the processor 3.

Furthermore, operations of the first transceiver device N1, and in particular operations that processor 3 is configured to perform, may be considered methods that the first transceiver device N1 is configured to carry out. Also, while the described functions and operations may be implemented in software, such functionality may as well be carried out via dedicated hardware or firmware, or some combination of hardware, firmware and/or software.

The memory module 5 may be one or more of a buffer, a flash memory, a hard drive, a removable media, a volatile memory, a non-volatile memory, a random access memory (RAM), or other suitable device. In a typical arrangement, the memory module 5 may include a non-volatile memory for long term data storage and a volatile memory that functions as system memory for the processor 3.

Figure 2A:
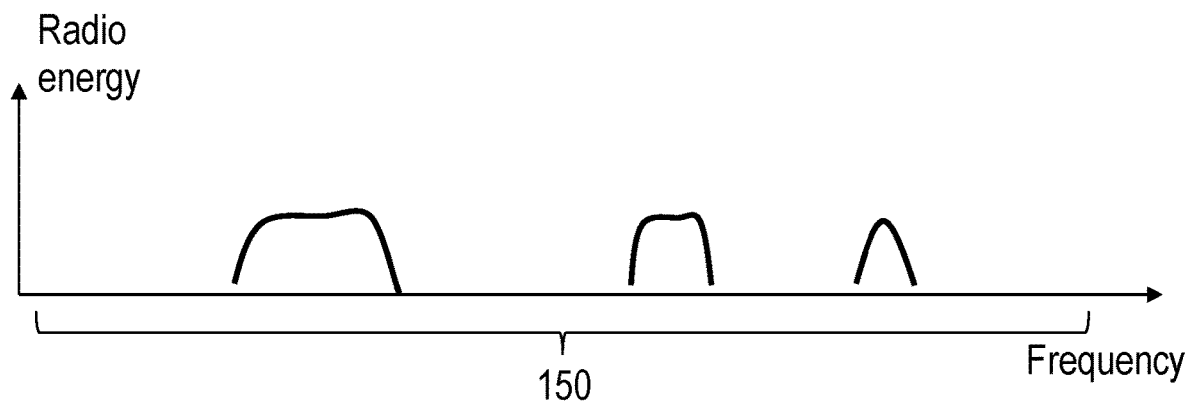
FIG. 2A is a graph illustrating radio energy in a frequency band.

FIG. 2A is a graph illustrating radio energy in a frequency band 150. The graph shows three frequency regions in which radio energy has been detected.

The first transceiver device N1 may not be capable of operating over the entire frequency band 150, since the total radio energy detected may be higher than the energy detection threshold. However, there may be sub-parts of the frequency band 150 where the radio energy is low and could allow for operation in case only the sub-band is being considered by the transceiver. One possibility to improve the capability of communication could therefore be to utilize one or more separate bandwidth parts (BWP) of the frequency band and it may be assigned a bandwidth part, BWP, to which it can limit its operation.

Figure 2B:
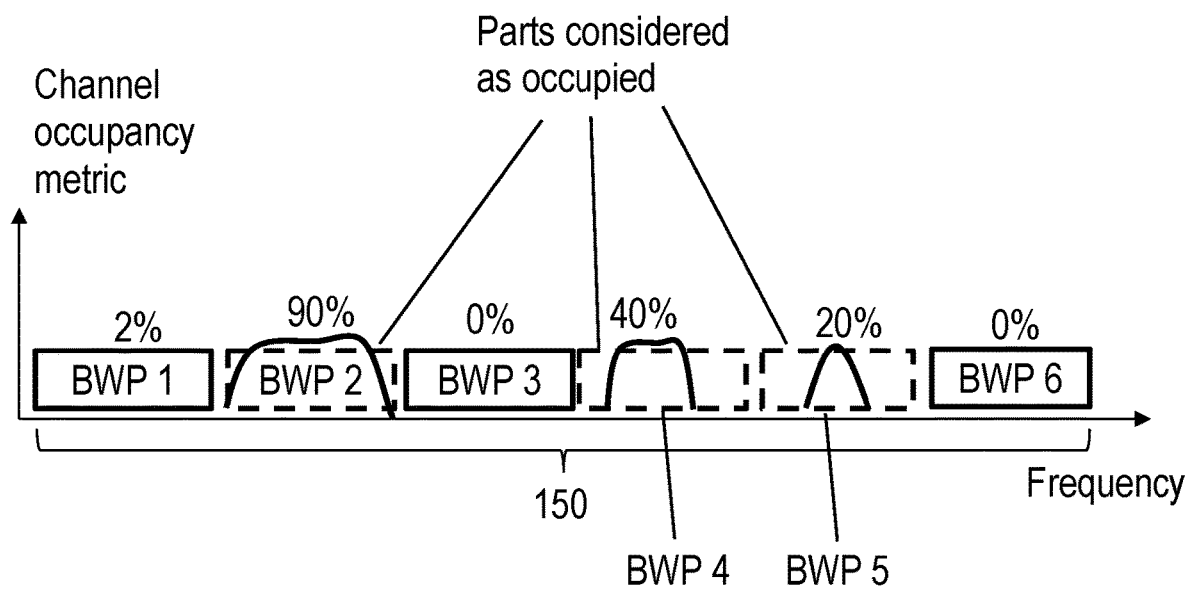
FIG. 2B is a graph illustrating channel occupancy within the frequency band of FIG. 2A.

FIG. 2B illustrates BWPs (Bandwidth parts) defined over the spectrum 150. BWP 2, BWP 4 and BWP 5 are considered as occupied due to large channel occupancy levels of 90%, 40% and 20% respectively. A threshold channel occupancy level may for example be 20%. If the first transceiver device N1 is assigned BWP 4 and if it is not capable of operating within other BWPs, it must perform LBT within BWP4 since shifting to a free BWP (e.g. BWP 1, 3 or 6) is not an option.

It may be appreciated that the transceiver device N1 is configured to be integrated (e.g. via a hardware integration) with an electronic device (e.g. a mobile phone, a network base station etc.) that permits the transceiver device N1 to access various functionalities of the electronic device, e.g. restarting the electronic device, and/or putting the electronic device in software update mode.

The transceiver module 7 can be used to transmit and receive radio signals via the antenna 9. The transceiver module 7 may be a transmitter and a receiver combined to share common circuitry or comprise a separate transmitter and receiver. The antenna 9 of the first transceiver device N1 is capable of receiving and transmitting in two polarizations. For example, the antenna 9 may be a patch antenna capable of receiving and transmitting in two polarizations such as a double fed patch or a corners truncated patch.

The first transceiver device N1 is preferably also capable of transmitting in two polarization directions in the frequency band 150. In a preferred embodiment, the frequency band 150 lies completely or partly within an unlicensed or shared frequency band 150 where a CCA procedure is required, for example the 60 GHz unlicensed band. In a preferred embodiment, the frequency band 150 could be within a frequency range of 2-100 GHz. This range includes the frequencies commonly used e.g. by cellular standards and local area networks for unlicensed operation, e.g. unlicensed operation of LTE (Long Term Evolution) with Licensed Assisted Access (LAA), MulteFire, Wi-Fi and Bluetooth protocols. It should be noted that there is no requirement that the frequency band 150 be unlicensed, the invention may be applied to unlicensed as well as licensed frequency band 150s.

The second transceiver device N2 may comprise a processor 4, memory module 6, and transceiver module 8 similar to or with similar functionalities as the processor 3, memory module 5, and transceiver module 7 of the first transceiver device N1.

An antenna 10 of the second transceiver device N2 may be capable of receiving and transmitting in only one or in two polarization directions. The following scenarios are possible:

N2 is transmitting in a single polarization direction and can receive only in a single polarization direction.

N2 is currently transmitting in a single polarization direction but can receive in two polarizations.

N2 is transmitting in different polarization directions, thus, it can also receive in two polarizations.

The term 'capable of receiving' refers to the current mode of receiving in the second transceiver device N2. Hence, it may be that the second transceiver device N2 is technically equipped to receive in two polarization directions but is currently only actively using one receive polarization. In this case, the second transceiver is referred to as being capable of receiving in only one polarization direction. In an alternative formulation, 'determining whether the second transceiver device N2 is capable of receiving in only a single polarization direction or whether the second transceiver device N2 is capable of receiving in two polarization directions' may be referred to as 'determining whether a current mode of receiving of the second transceiver device N2 is a single polarization receiving mode or a dual polarization receiving mode'. All other instances of "capable of receiving in . . . polarization" would then also be replaced by "currently in a . . . polarization receiving mode". Since the scenario or mode at N2 is generally not given, the skilled person will appreciate that different formulations may be applied to describe this a priori 'unknown state'.

It is noted that a node communicating on an unlicensed band according to e.g. the 3GPP (3rd Generation Partnership Project) protocol may also have a licensed frequency communication.

FIGS. 3 through 8 show flow diagrams illustrating exemplary operations which may be performed by an exemplary transceiver device according to this disclosure, such as by the processor 3 of the first transceiver device N1. The flow diagrams of FIGS. 3 through 8 also shows steps of exemplary methods according to the present disclosure. The various descriptions referring to the figures are thus meant to embody operations of the first transceiver device N1 according to the disclosure, and in particular operations that processor 3 is configured to perform, as well as method steps of methods according to the disclosure.

Figure 3:
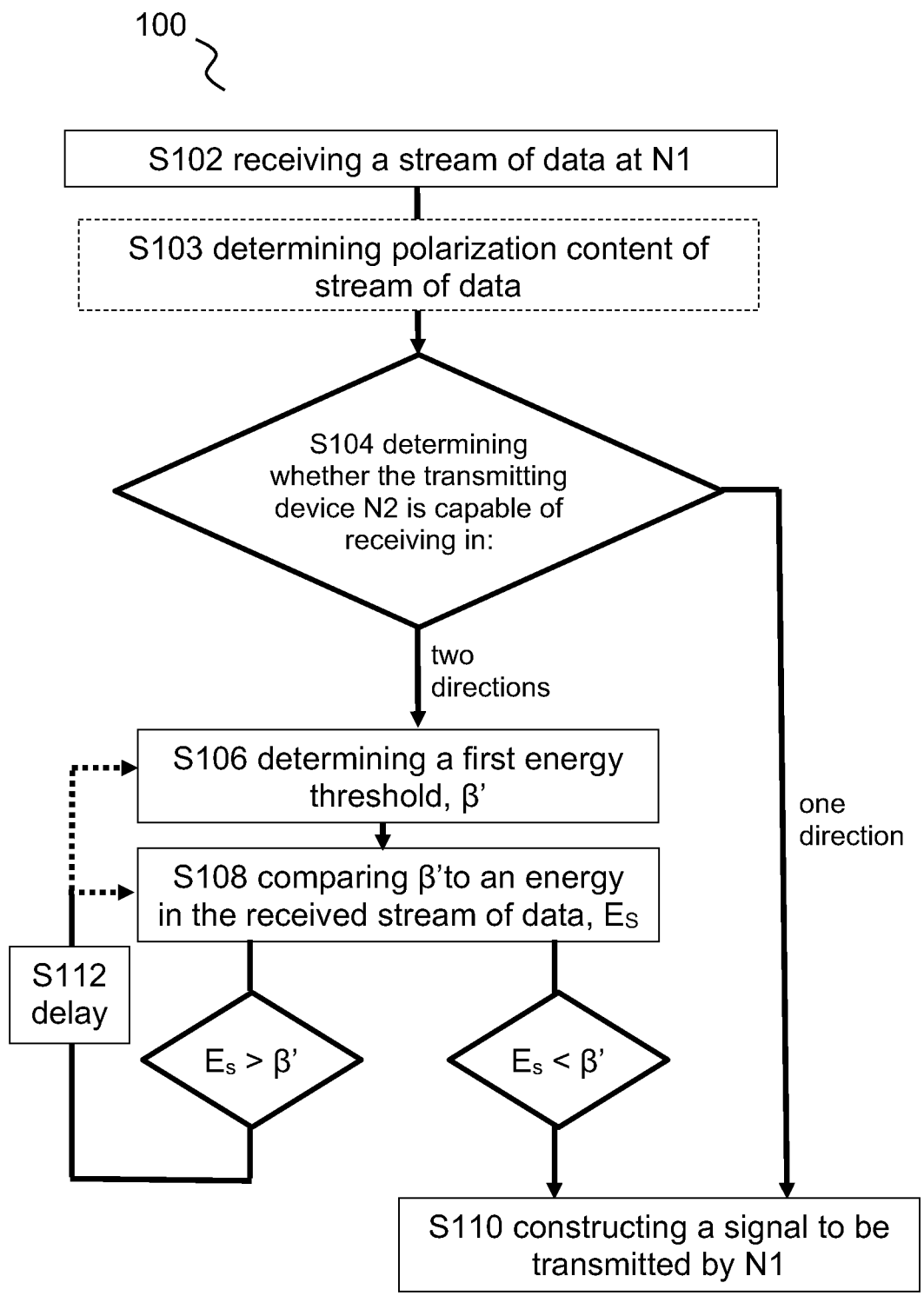
FIGS. 3-8 are flow diagrams of exemplary methods and method steps according to the disclosure or operations to be performed by an exemplary first transceiver device according to the disclosure.

Referring to FIG. 3, the present disclosure provides a method 100 of performing a listen-before-talk procedure in a first transceiver device N1 for wireless electromagnetic communication in a frequency band 150. As for an embodiment of the first transceiver device N1 disclosed previously, the frequency band 150 may lie completely or partly within an unlicensed or shared frequency band 150, such as the 60 GHz unlicensed band. In one embodiment, the frequency band 150 lies within a frequency range of 2-100 GHz. The method 100 preferably comprises receiving S102, in two orthogonal polarisation directions, at the first transceiver device N1 a stream of data in the frequency band 150 from a second transceiver device N2. In the present disclosure, a stream of data refers to what is transmitted at a time by a single transmitter. It may consist of one, two or more signals having different polarisations, frequencies, modulations etc. As mentioned previously, the second transceiver device N2 may be capable of receiving and transmitting in one or in two polarizations—this information is generally not available to the first transceiver device N1 prior to receiving the stream of data 11. The method 100 comprises determining S104 whether the second transceiver device N2 is capable of receiving in only a single polarization direction or whether the second transceiver device N2 is capable of receiving in two polarization directions. This information is to be used by the method 100 in order to carry out the listen-before-talk procedure and thus to determine whether and what signals the first transceiver device N1 may transmit. In one embodiment, the determination in S104 comprises determining S103 a polarization content of the received stream of data 11. In this respect, polarization content refers to the polarisation directions of the signal(s) making up the received stream of data 11.

If it in S104 is determined that the second transceiver device N2 is capable of receiving in two polarization directions, then the method 100 may comprise determining S106 a first energy threshold $\beta'$ equal to or larger than a regulated energy threshold $\beta$ (described previously) for listen-before-talk within the frequency band 150. The first energy threshold is the energy threshold to be applied in the method 100 according to the present disclosure and is preferably determined based on the content of the received stream of data 11. In one embodiment, first energy threshold is determined differently depending upon whether the received stream of data 11 comprises only a single polarization direction or different polarization directions. Since the first energy threshold is larger than a regulated energy threshold, there will be instances where prior art LBT procedure using the regulated energy threshold would result in a transceiver not being allowed to transmit, but where the LBT procedure of the present disclosure using the first energy threshold would result in a transceiver being allowed to transmit. However, the risk of interference may be the same in both cases. Thus, the present disclosure provides the advantage of a more efficient communication since the spectral efficiency is improved when the first energy threshold $\beta'$ is larger than the regulated energy threshold $\beta$. Different ways of determining the first energy threshold will be described in relation to different embodiments.

After determining a first energy threshold, the method 100 comprises comparing S108 the first energy threshold to an energy $E_S$ of the received stream of data 11 in the frequency band 150. The energy $E_S$ is an energy level in the stream of data 11, typically measured in dBm. If the energy of the received stream of data 11 is smaller than the first energy threshold, then the method 100 may comprise constructing S110 a signal to be transmitted within the frequency band 150 by the first transceiver device N1. If, on the other hand, the energy of the received stream of data 11 is larger than the first energy threshold, then the first transceiver device N1 cannot transmit without causing interference, i.e., it can transmit, but the transmission is likely to cause interference. In this case, the method 100 may comprise delaying S112 subsequent attempts. In one or more embodiments, if comparing the first energy threshold to an energy of the received stream of data reveals that the energy of the received stream of data is larger than the first energy threshold, then the processor is configured to wait an amount of time—a delay S112—before attempting to perform another a listen-before-talk procedure. In one embodiment, the first energy threshold may be determined anew in subsequent attempts since the first energy threshold may be based on the content of the received stream of data 11, which content might have changed since the previous attempt. On another embodiment, the already determined first energy threshold is compared to the current energy of the received stream of data 11.

In one embodiment, the first transceiver device N1 listens to the stream of data 11 within a first part $\Delta f_1$ of the frequency band $f_{tot}$ and the signal to be transmitted is constructed to also be within first part Mi.

If, back in S104, it is determined that the second transceiver device N2 is capable of receiving in only a single polarization direction, then the method 100 may comprise directly constructing S110 a signal to be transmitted within the frequency band 150 by the first transceiver device N1, i.e. without determining a first energy threshold or comparing with an energy of the received stream of data 11. This is so because the first transceiver device N1 may then construct a signal that the second transceiver device N2 will not be able to receive. In one embodiment, instead of not determining a first energy threshold, the first energy threshold may be determined as zero, $\beta'=0$, which will produce the same results. For the purposes of writing a program to be executed by the processor, this embodiment may be simpler. It is noted that here, the first energy threshold does not depend on the regulated energy threshold but is based on the content—here the polarization—of the received stream of data.

Figure 4:
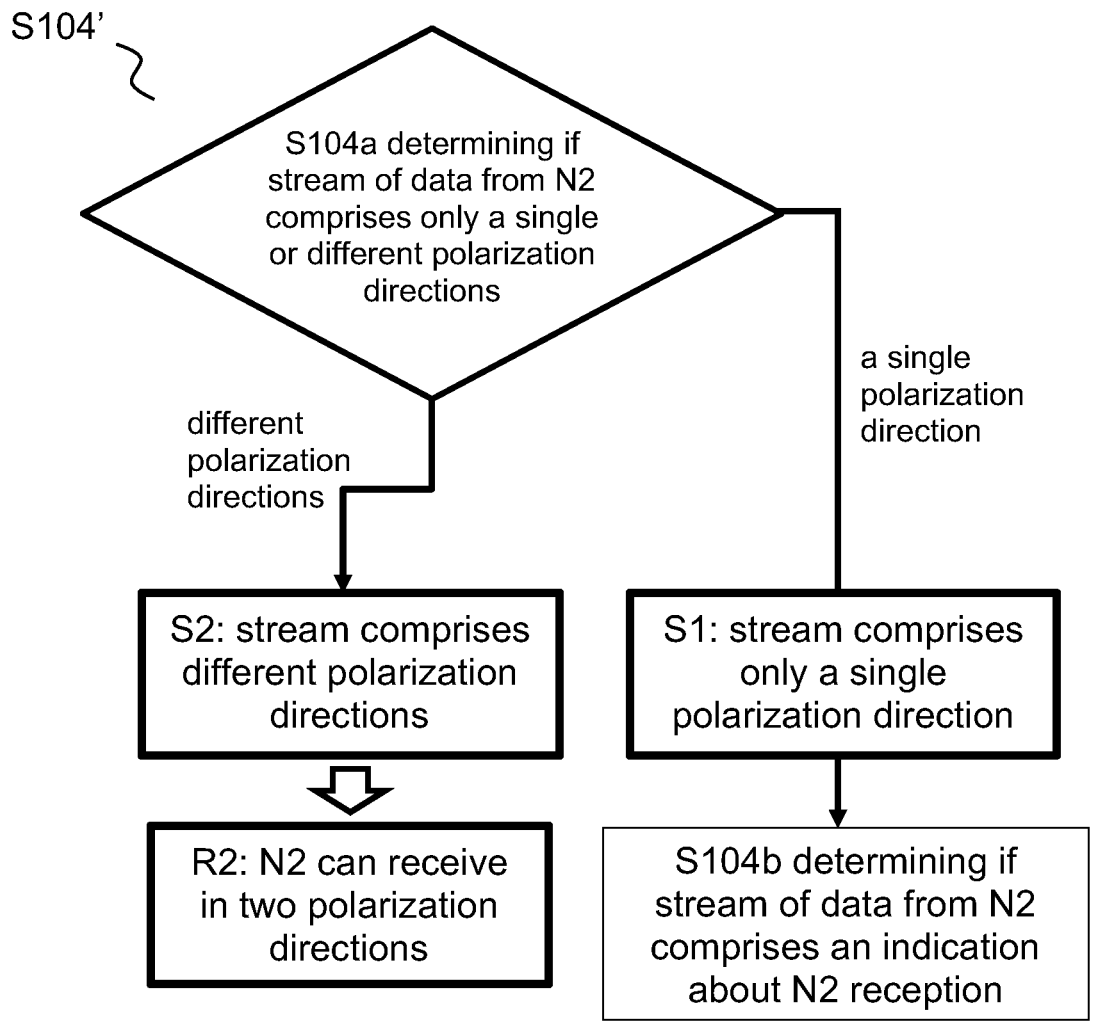

In one embodiment illustrated in the flow diagram of FIG. 4, determining S104' whether the second transceiver device N2 is capable of receiving in only a single polarization direction or in two polarization directions comprises determining S104a whether the received stream of data 11 comprises a single polarisation direction or different polarization directions. This determination S104a is similar to—and may be identical to—the determination S103 of the polarization content of the received stream of data 11. Determining the polarization content, S105, comprises determining the actual polarization directions of the signals comprise in the stream of data 11, whereas in S104a it is only required to determine whether there is only one or different polarization directions in the stream of data.

If the received stream of data 11 comprises only a single polarisation direction, then it comprises a single linearly polarized signal or two or more linearly polarized signals with parallel polarizations. If the received stream of data 11 comprises different polarisation directions, then it can either comprise more linearly polarized signals with non-parallel polarizations or one or more elliptically polarized signals. Put shortly, the determination of S103 or S104a can, in one embodiment, be carried out by listening to the received stream of data 11 in two orthogonal polarizations and determining whether there is a difference in the data or signal shape in each of the polarisations as a function of time. If there is no difference, the received stream of data 11 comprises only a single polarisation direction. If the received stream of data 11 comprises different polarization directions, referred to as S2, then the second transceiver device N2 is obviously capable of transmitting in two different polarizations, and it can be concluded that the second transceiver device N2 is therefore also capable of receiving in two polarization directions, referred to as R2. This, R2, is the information needed for the method 100 illustrated in FIG. 1 to proceed from S104 to S106. The thick-lined boxes referenced S2 and R2 (and later S1 and R1) indicate conclusions that can be made from the preceding steps or operations.

If, in S104a of S104', it is determined that the received stream of data 11 comprises only a single polarization direction, referred to as S1. Although the second transceiver device N2 in this case only transmits in one polarization direction, it might still be capable of transmitting in two polarization directions. Hence, in the case of S1, S104a is nonconclusive with regard to the reception capabilities of the second transceiver device N2, i.e. whether it can receive in only one or in two polarization directions. In this case, the determination of S104' may comprise determining 104b whether the received stream of data 11 comprises an indication indicating either that the second transceiver device N2 is capable of receiving in only one polarization or that the second transceiver device N2 is capable of receiving in two polarization directions. Such indication will be described in more detail later.

Figure 5:
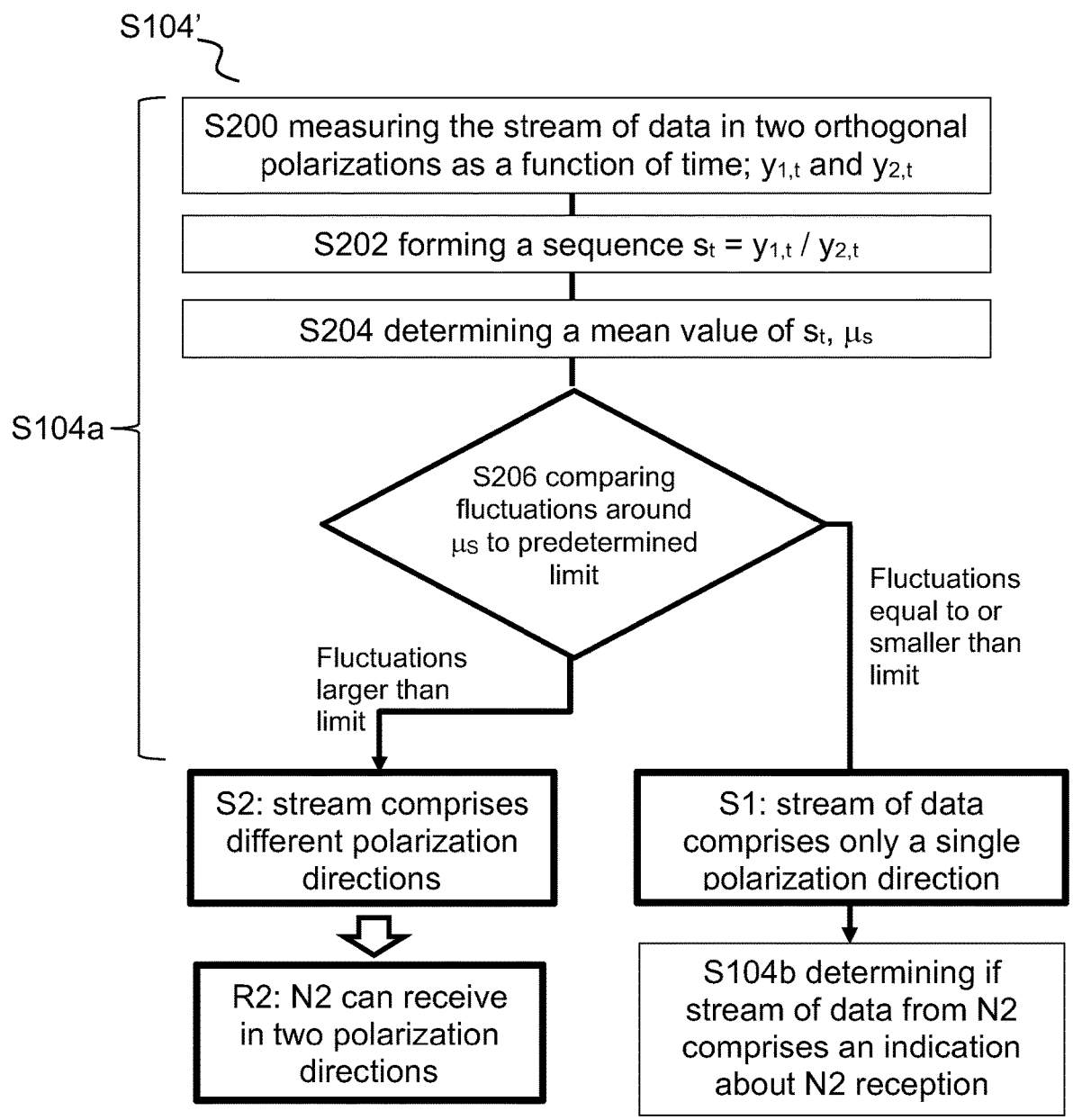

FIG. 5 illustrates a flow diagram of an embodiment of S104' from FIG. 4, the determination of whether the stream of data 11 from the second transceiver device N2 comprises only a single or different polarization directions (S1 or S2). This embodiment includes an embodiment of S104a that is also an embodiment of the determination of the polarization content S103. Here, S104a comprises measuring S200 the received stream of data 11 in two orthogonal polarization directions as a function of time. Such measurement may be carried out by measuring an electromagnetic power, an electric or magnetic field amplitude, or a scalar proportional to one of these in each of the orthogonal polarisation directions. The two orthogonal polarisation directions can be any two orthogonal polarisation directions capable of receiving the stream of data 11. The measurement S200 results in two sequences $y_{1,t}$ and $y_{2,t}$, '1' and '2' referring to each of the two orthogonal polarisation directions and index 't' being the time of the measurement.

The step S104a further comprises forming S202 a sequence $S_t$ constructed as the ratio per time unit of the two orthogonal polarizations of the received stream of data 11, $s_t = y_{1,t}/y_{2,t}$ or $s_t = y_{2,t}/y_{1,t}$. Then, in S204, determining a mean value $\mu_s$ of the sequence of ratios and comparing S206 fluctuations around the mean with a predetermined limit. Such fluctuations may be quantified in different ways using well-known statistical metrics such as standard deviation, coefficient of variation, etc. The predetermined limit may be set based on a quantified standard deviation or an estimated difference between min and max (i.e. delta analysis). If the fluctuations exceed the predetermined limit, then S2—the received stream of data 11 comprises different polarization directions. If said fluctuations do not exceed the predetermined limit, then S1—the received stream of data 11 comprises only a single polarization direction—and S104a is nonconclusive with regard to the reception capabilities of the second transceiver device N2. The approach underlying this embodiment of S104a is that if the received stream of data 11 comprises only a single polarization direction, then a projection of the EM field onto the two orthogonal polarisation directions might have different amplitudes, but will vary synchronously. This is because the two projections carry the same data with respect to time, and fluctuations around $\mu_R$ will be due to noise and the accuracy and resolution of the measurement which are predictably small. If, on the other hand, the received stream of data 11 comprises two data signals with different polarization directions, fluctuations around $\mu_R$ will be larger.

Figure 6:
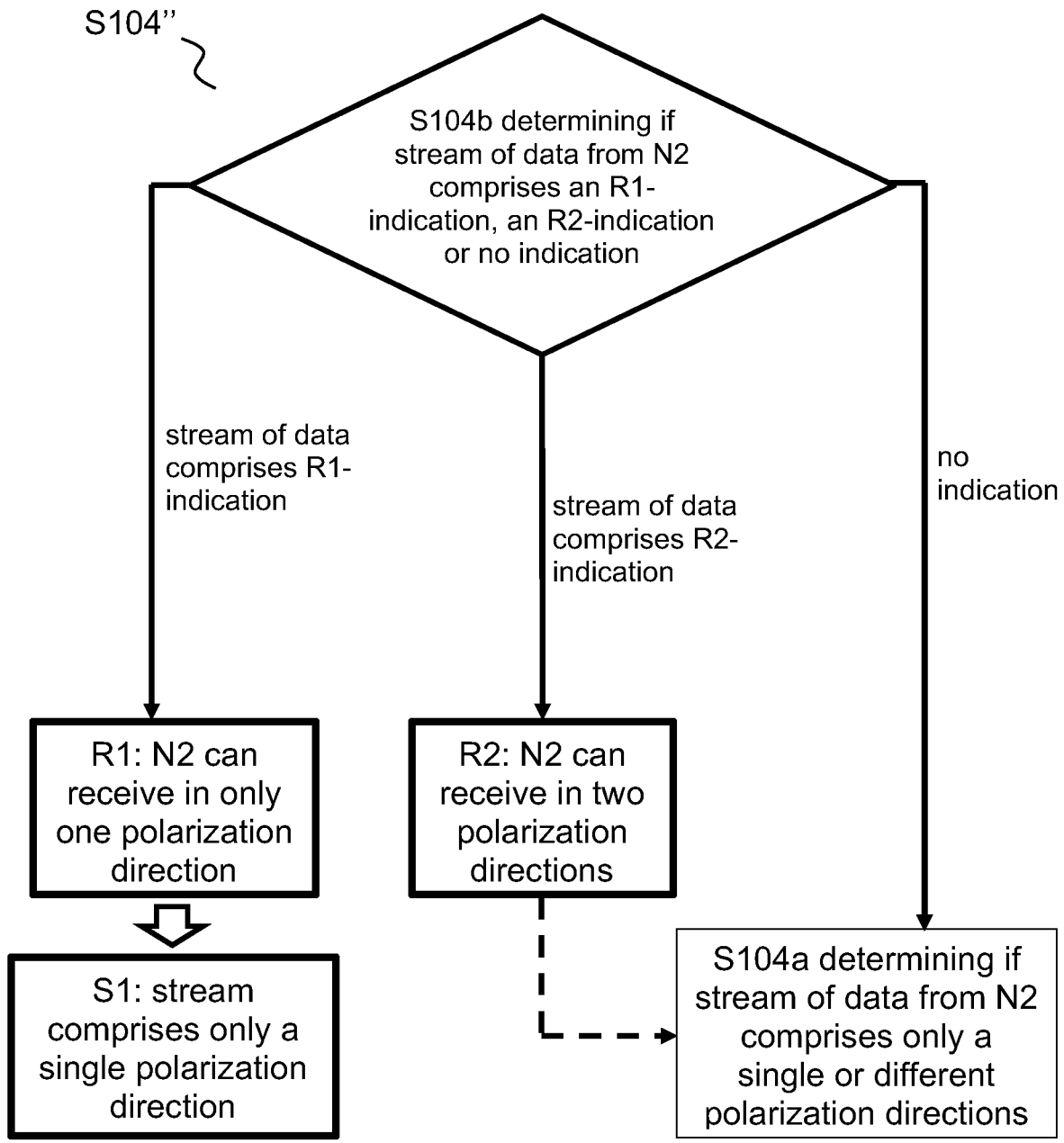

In an alternative embodiment illustrated in the flow diagram of FIG. 6, determining S104" whether the second transceiver device N2 is capable of receiving in only a single polarization direction or in two polarization directions comprises determining 104*b* whether the received stream of data 11 comprises an indication indicating that the second transceiver device N2 is capable of receiving in only one polarization direction (R1-indication), an indication indicating that the second transceiver device N2 is capable of receiving in two polarization directions (R1-indication), or no indication. This embodiment presumes a rule or a standard where the second transceiver device N2 includes such indication in signals transmitted by the second transceiver device N2. The indication may be a positive or a negative indication of any of the scenarios that the second transceiver device N2 is capable of receiving in only one or in two polarization directions, as long as it is known at the first transceiver device N1.

If, in S104*b* of S104", it is determined that the received stream of data 11 comprises an R1-indication, it can be concluded that the second transceiver device N2 is capable of receiving in only one polarization direction, referred to as R1. It can then also be concluded that the received stream of data 11 comprises only a single polarization direction, S1.

If, in S104*b* of S104", it is determined that the received stream of data 11 comprises an R2-indication, it can be concluded that the second transceiver device N2 is capable of receiving in two polarization directions. As will be seen later, the polarization content of the received stream of data 11 may be of interest, for example in relation to determining the first energy threshold. As S104*b* is nonconclusive with regard to the polarization content, some embodiments of determination S104" may comprise S104—a determining if stream of data from N2 comprises only a single or different polarization directions, described in relation to FIGS. 4 and 5. If, in S104*b* of S104", it is determined that the stream of data 11 does not comprise an indication, the determination of S104" may also comprise the determination S104*a*. The result of the determination S104*a* will be the polarization content of the first stream of data 11, i.e. either S1 or S2.

In overview:
R1: The second transceiver device N2 is capable of receiving in only one polarization direction.
R2: The second transceiver device N2 is capable of receiving in two polarization directions.
S1: The received stream of data 11 comprises only a single polarization direction.
S2: The received stream of data 11 comprises two polarization directions.

It is noted that in the method 100 in FIG. 3, only the information R1 or R2 is required to proceed from S104 to either S106 or S110. However, depending of the approach used in S104 and on the specific case, S1 and/or S1 may be determined in the process. Also, some embodiments of the determination S106 of the first energy threshold may require determining S1 or S2.

In an embodiment, the indication relating to the second transceiver device N2's reception capabilities is implemented by minor frequency offsets in the applied encoding scheme. This approach is advantageous, since the intended receiver knows that the frequency offsets are present and can remove them at no cost. Also, this approach has zero additional power cost, essentially no spectral efficiency loss, and is detectable at the receiver with miniscule complexity. The detailed implementation may be different for different encoding schemes. In a preferred embodiment, signals to be transmitted by the second transceiver device N2 are encoded using orthogonal frequency-division multiplexing (OFDM), and the indication may be generated by offsetting the frequency of predetermined OFDM symbols. In this case, the determination S104*b* of an indication relating to the second transceiver device N2's reception capabilities comprises detecting frequency offsets in OFDM symbols of the received stream of data 11 and correlate any detected frequency offsets with a predetermined indication scheme for whether the second transceiver device N2 is capable of receiving in only a single polarization direction or in two polarization directions.

Figure 7:
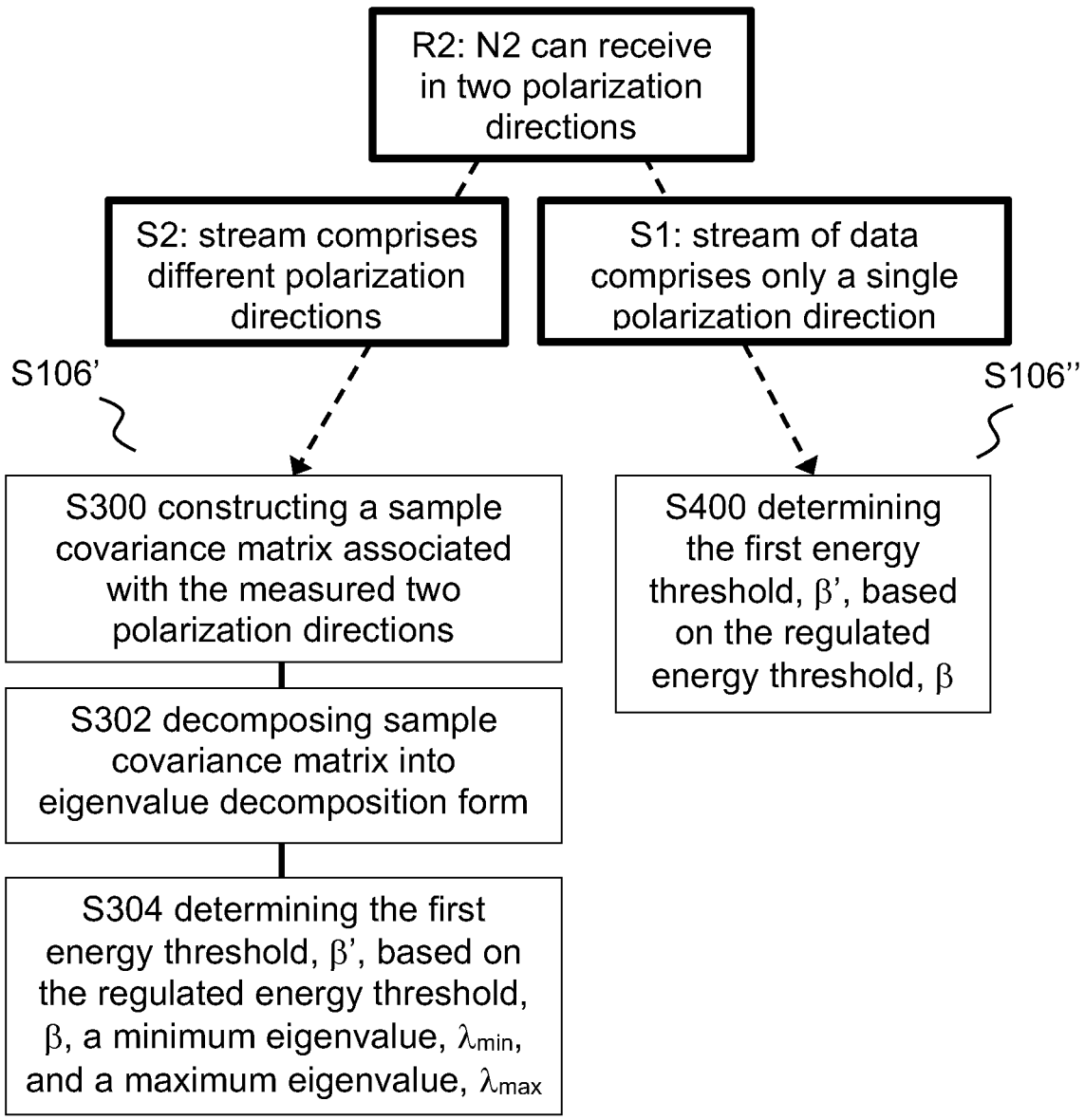

According to the method 100 described in relation to FIG. 1, the determination S106 of the first energy threshold $\beta'$ follows when it has been determined that the second transceiver device N2 can receive in two polarization directions, R2. It may be preferred that the first energy threshold is determined based on the polarization content of the received stream of data 11. According to some embodiments, the determination S106 depends on the content of the received stream of data 11, such as on the number of signals with different polarisation directions in the received stream of data 11, i.e. depending on whether case S1 or S2 applies. FIG. 7 is a flow diagram illustrating two embodiments S106' and S106" of the determination S106, corresponding to the cases S2 and S1, respectively.

In the embodiment S106' case S2 applies, and the received stream of data 11 involves different polarization directions, which means that any polarization direction will have a non-zero projection of EM field amplitude. The determination of $\beta'$ in S106' comprises constructing S300 a sample covariance matrix (SCM) associated with the measured two orthogonal polarizations of the received stream of data 11. The constructing S300 of a sample covariance matrix for the received stream of data 11 may comprise (in the following, underlining means a matrix, bold means a vector, ^T means transposing a vector (flip a row into a column) and * means transpose and complex conjugate (the imaginary part changes sign, can also be written ^H (Hermetian conjugate)):

1. Set $\underline{R}$=[0 0;0 0].
2. At time t, the measured two orthogonal polarizations of the received stream of data 11 from S104*a* are $y_{1,t}$ and $y_{2,t}$. One then forms y=[$y_{1,t}$ $y_{2,t}$]^T and compute $\underline{R}$=$\underline{R}$+ $\underline{yy}$*.
3. Repeat bullet 2 for t=1 to N.
4. The sample covariance matrix is R/N.

In S302, the sample covariance matrix is decomposed into its eigenvalue decomposition form. This is a standard procedure in linear algebra also referred to as eigendecomposition or spectral decomposition resulting in a representation of the matrix in its eigenvectors v and eigenvalues $\lambda$. Then, in S304, the first energy threshold is determined based on the regulated energy threshold $\beta$, a minimum eigenvalue $\lambda_{min}$ and a maximum eigenvalue $\lambda_{max}$. In an exemplary embodiment, the first energy threshold is determined as $\beta'=2\beta \lambda_{max}/(\lambda_{min}+\lambda_{max})$, i.e. based on both the regulated energy threshold $\beta$ and on the content of the received stream of data. Since $\lambda_{min}<\lambda_{max}$ it follows that $\lambda_{max}/(\lambda_{min}+\lambda_{max})>\frac{1}{2}$ and $\beta'>\beta$, thus the first energy threshold applied in this embodiment leads to a more efficient use of the frequency band 150. Then, if the energy of the received stream of data 11 is smaller than the first energy threshold determined in S304, then the signal to be transmitted by the first transceiver will be constructed. In the embodiment of S106', the determination of β' depends on the content of the received stream of data 11, and the value of β' may thus change over time, such as between subsequent attempts as described in relation to S112 of FIG. 3.

In the embodiment S106" in FIG. 7, S1 applies and the received stream of data 11 involves only a single polarization direction whereas the second transceiver device N2 is capable of receiving in two polarization directions (R2). In this case, all signals to be transmitted by the first transceiver device N1 will be received by the second transceiver device N2 and will cause interference, thus it is preferred to assess the activity in on the channel. The determination of β' in S106" comprises determining S400 the first energy threshold based on the regulated energy threshold. In an exemplary embodiment, the first energy threshold is determined as β'=2β. Then, if the energy of the received stream of data 11 is smaller than the first energy threshold determined in S400, then the signal to be transmitted by the first transceiver will be constructed.

Figure 8:
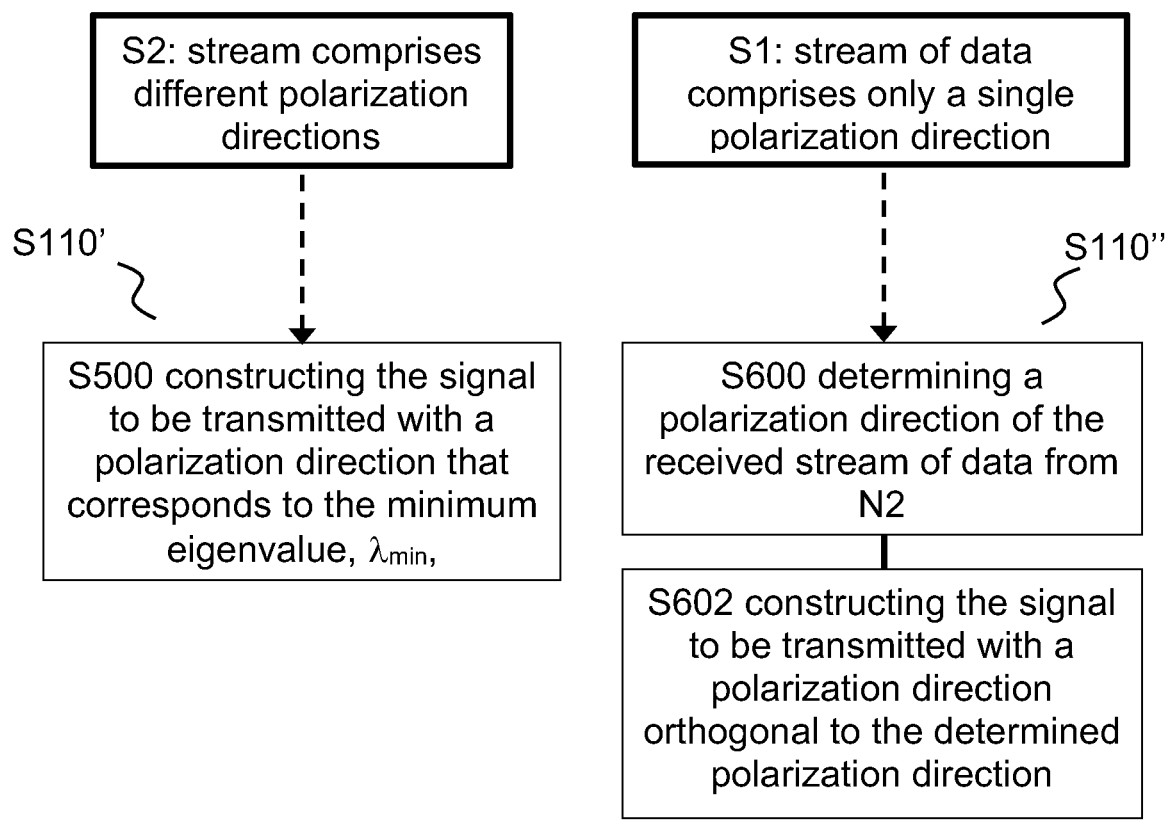

Turning to the construction S110 a signal to be transmitted by the first transceiver in the method 100 described in relation to FIG. 3, FIG. 8 is a flow chart illustrating different embodiments. Constructing a signal to be transmitted is only initiated if the second transceiver device N2 is capable of receiving in only a single polarization direction (R1) or if the energy of the received stream of data 11 is smaller than the determined first energy threshold (R2).

According to some embodiments, how the signal to be transmitted is to be constructed depends on whether the received stream of data 11 comprises only one (S1) or different (S2) polarization directions. If it has been determined in S104 that the second transceiver device N2 can only receive in a single polarization direction (R1), S1 follows logically. If it has been determined in S104 that the second transceiver device N2 can receive in two polarization directions (R2), either of S1 or S2 will have been determined in the various embodiments of S106. Thus, at S110, it is known whether S1 or S2 applies.

The signal to be transmitted is preferably a linearly polarized signal, and the constructing of the signal to be transmitted may therefore comprises determining a polarization direction of the signal to be transmitted. In one embodiment, the constructing of the signal to be transmitted comprises determining S103 (FIG. 3) a polarization content of the received stream of data 11 and determining a polarization direction of the signal to be transmitted based on the determined polarisation content. In this respect, polarization content refers to the polarisation directions of the signal(s) making up the received stream of data 11.

In one embodiment S110', S2 has been determined and the eigenvector and eigenvalues has been determined in S302. the method comprises constructing S500 the signal to be transmitted to have a polarization direction that corresponds to the minimum eigenvalue, $\lambda_{min}$, i.e. the principal eigenvector. This has the advantage of minimizing the interference caused by the transmission.

In another embodiment S110", S1 has been determined and the method comprises constructing the signal to be transmitted by determining S600 a polarization direction of the received data stream from the second transceiver device N2, and constructing S602 the signal to be transmitted by the first transceiver to have a polarization direction that is orthogonal to the determined polarization direction of the received data stream. This signal will then be in the nullspace of the transmission channel of the second transceiver device N2 and will therefore cause zero disturbances to the second transceiver device N2. Referring again to FIG. 1, the present disclosure provides a network 12 of transceiver devices for wireless electromagnetic communication in a frequency band 150, comprising the first transceiver device N1 and the second transceiver device N2. The processor 4 of the second transceiver device N2 is configured to generate the indication indicating whether the second transceiver device N2 is capable of receiving in only a single polarization direction or in two polarization directions, and to include the indication in signals to be transmitted by the second transceiver device N2.

In one embodiment, the indication may be implemented by minor frequency offsets in the applied encoding scheme. In another embodiment, where signals to be transmitted by the second transceiver device N2 are encoded using orthogonal frequency-division multiplexing (OFDM), the processor 4 of the second transceiver device N2 is configured to generate the indication by offsetting the frequency of predetermined OFDM symbols. In an exemplary embodiment, the processor 4 of the second transceiver device N2 is configured to introduce a frequency offset $f_{Off}$ of a few 100 Hz in an alternate fashion. For example, OFDM symbol 1, 3, 5, . . . have $f_{Off}$=0 Hz, and symbols 2, 4, 6, . . . have $f_{Off}$=200 Hz. The frequency offsets are preferably smaller than a sub-carrier spacing of the OFDM encoding.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and networks described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

The invention claimed is:

1. A method of performing a listen-before-talk procedure in a first transceiver device for wireless electromagnetic communication in a frequency band, the method comprising:
   receiving, in two orthogonal polarization directions, at the first transceiver device a stream of data in the frequency band from a second transceiver device;
   determining whether the second transceiver device is capable of receiving in only a single polarization direction or whether the second transceiver device is capable of receiving in two polarization directions;
   if the second transceiver device is capable of receiving in two polarization directions, then determining a first energy threshold equal to or larger than a regulated energy threshold for listen-before-talk within the frequency band, and comparing the first energy threshold to an energy of the received stream of data in the frequency band;
   if the second transceiver device is capable of receiving in only a single polarization direction or if the energy of the received stream of data is smaller than the first energy threshold, then constructing a signal to be transmitted within the frequency band by the first transceiver device.

2. The method according to claim 1, wherein determining whether the second transceiver device is capable of receiving in only a single polarization direction or in two polarization directions comprises determining a polarization content of the received stream of data.

3. The method according to claim 2, wherein the first energy threshold is determined based on the polarization content of the received stream of data.

4. The method according to claim 2, wherein constructing the signal to be transmitted comprises determining a polarization direction of the signal to be transmitted based on the determined polarization content.

5. The method according to claim 3, wherein constructing the signal to be transmitted comprises determining a polarization direction of the signal to be transmitted based on the determined polarization content.

6. The method according to claim 1, wherein determining whether the second transceiver device is capable of receiving in only a single polarization direction or in two polarization directions comprises determining whether the received stream of data comprises a single polarization direction or different polarization directions by
   measuring the received stream of data in two orthogonal polarization directions as a function of time;
   forming a sequence constructed as the ratio per time unit of the two orthogonal polarizations of the received stream of data;
   determining a mean value of the sequence of ratios; and
   comparing fluctuations around the mean with a predetermined limit;
   if said fluctuations exceed the predetermined limit, then the received stream of data comprises different polarization directions and the second transceiver device transmits in different polarization directions and is capable of receiving in two polarization directions;
   if said fluctuations do not exceed the predetermined limit, then the received stream of data comprises only a single polarization direction.

7. The method according to claim 6, wherein if the received stream of data comprises different polarization directions, the method comprises determining the first energy threshold based on the in two orthogonal polarization directions received stream of data by
   constructing a sample covariance matrix associated with the measured two orthogonal polarizations of the received stream of data;
   decomposing the sample covariance matrix into its eigenvalue decomposition form;
   determining the first energy threshold based on the regulated energy threshold, a minimum eigenvalue and a maximum eigenvalue; and
   if the energy of the received stream of data is smaller than the first energy threshold, then constructing the signal to be transmitted by the first transceiver to have a polarization direction that corresponds to the minimum eigenvalue.

8. The method according to claim 1, wherein determining whether the second transceiver device is capable of receiving in only a single polarization direction or in two polarization directions comprises determining whether the received stream of data comprises an indication indicating either that the second transceiver device is capable of receiving in only one polarization or that the second transceiver device is capable of receiving in two polarization directions.

9. The method according to claim 8, wherein determining whether the received stream of data comprises the indication comprises detecting frequency offsets in orthogonal frequency-division multiplexing symbols of the received stream of data and correlate any detected frequency offsets with a predetermined indication scheme for whether the second transceiver device is capable of receiving in only a single polarization direction or in two polarization directions.

10. The method according to claim 1, comprising, if it is determined that the second transceiver device is capable of receiving in only a single polarization direction, then constructing a signal to be transmitted by the first transceiver by:
    determining a polarization direction of the received data stream from the second transceiver device; and
    constructing the signal to be transmitted by the first transceiver to have a polarization direction that is orthogonal to the determined polarization direction of the received data stream.

11. The method according to claim 1, comprising, if it is determined that the second transceiver device is capable of receiving in two polarization directions, then determining whether the received stream of data comprises only a single polarization direction and if, then
    determining the first energy threshold based on the regulated energy threshold; and if the energy of the received stream of data is smaller than the first energy threshold, then
    constructing a signal to be transmitted by the first transceiver by determining a polarization direction of the received stream of data from the second transceiver device; and constructing the signal to be transmitted by the first transceiver to have a polarization direction that is orthogonal to the determined polarization direction.

12. The method according to claim 1, comprising, if comparing the first energy threshold to an energy of the received stream of data reveals that the energy of the received stream of data is larger than the first energy threshold, then the method comprises: waiting an amount of time—a delay—before attempting to perform another a listen-before-talk procedure.

13. The method according to claim 1, wherein the signal is constructed when the energy of the received stream of data is larger than the first energy threshold if the second transceiver device is capable of receiving in only one polarization direction.

14. The method according to claim 1, wherein the step of comparing the first energy threshold to an energy of the received stream of data in the frequency band is performed only when the second transceiver device is capable of receiving in two polarization directions.

15. A first transceiver device for wireless electromagnetic communication in a frequency band, the first transceiver device being capable of receiving in two polarization directions in the frequency band and comprises a processor configured to perform a listen-before-talk procedure by
receiving, in two orthogonal polarization directions, a stream of data from a second transceiver device;
determining whether the second transceiver device is capable of receiving in only a single polarization direction or whether the second transceiver device is capable of receiving in two polarization directions;
if the second transceiver device is capable of receiving in two polarization directions, then determining a first energy threshold equal to or larger than a regulated energy threshold for listen-before-talk within the frequency band and comparing the first energy threshold to an energy of the received stream of data;
if the second transceiver device is capable of receiving in only a single polarization direction or if the energy of the received stream of data is smaller than the first energy threshold, then constructing a signal to be transmitted by the first transceiver.

16. A network of transceiver devices for wireless electromagnetic communication in a frequency band, comprising a first transceiver device according to claim 15 and a second transceiver device comprising a processor configured to
generate an indication indicating whether the second transceiver device is capable of receiving in only a single polarization direction or in two polarization directions; and
including the indication in signals to be transmitted by the second transceiver device.

17. The network of transceiver devices according to claim 16, wherein signals to be transmitted by the second transceiver device are encoded using orthogonal frequency-division multiplexing, OFDM, and wherein the processor of the second transceiver device is configured to generate the indication by offsetting the frequency of predetermined OFDM symbols.

* * * * *